United States Patent Office

2,930,684
Patented Mar. 29, 1960

2,930,684

PROPELLANT COMBINATION INCLUDING LIQUID FLUORINE AND LIQUID OXIDE OXIDIZER

Irving A. Kanarek, Los Angeles, Calif., assignor to North American Aviation, Inc.

No Drawing. Application March 23, 1953
Serial No. 344,186

8 Claims. (Cl. 52—.5)

This invention pertains to a mixture of liquid fluorine and other liquid oxidizers together with a fuel in a rocket propulsion system.

While liquid fluorine as an oxidizer with a given fuel creates an efficient rocket engine which has high specific thrust, the use of a mixture of liquid fluorine and liquid oxygen or liquid fluorine and nitrogen tetroxide as an oxidizer, together with the same given fuel, increases the utility of a given fluorine supply because about one-third of the oxidizer is replaced with a less expensive oxidizer. The combination of this invention has better handling properties than liquid fluorine alone and creates less fluorine compounds in the exhaust products of the rocket, when it is used with a given fuel, while it still retains a specific thrust and bulk density which compares with a liquid fluorine given fuel combination. Liquid oxygen and liquid fluorine as well as liquid oxygen and nitrogen tetroxide are miscible. Reaction between liquid fluorine and liquid oxygen is extremely low because fluorine monoxide is not easily formed even at room temperature.

It is therefore an object of this invention to provide an oxidizer which is suitable for use with a fuel and which has good handling properties.

It is another object of this invention to provide an oxidizer which produces less corrosive exhaust products than pure fluorine.

It is another object of this invention to provide an oxidizer-fuel combination which has a very high specific thrust.

It is another object of this invention to provide an oxidizer-given fuel combination which has performance characteristics which compare favorably with a liquid fluorine-given fuel combination.

It is another object of this invention to provide an oxidizer which is only moderately corrosive.

It is another object of this invention to provide an oxidizer which is less corrosive than pure fluorine.

It is another object of this invention to provide an oxidizer-given fuel combination which has a high specific thrust.

Other objects of invention will become apparent from the following description.

For example, the use of a liquid fluorine-liquid oxygen or a liquid fluorine-nitrogen tetroxide mixture oxidizer, together with a fuel, creates a propellant combination which has a performance very close to that of a liquid fluorine-liquid ammonia propellant combination but does not have some of the undesirable characteristics of a fluorine-ammonia combination. For instance, triethylamine or gasoline, when combined with an oxidizer of this invention, has a specific thrust of 97.4% of the specific thrust of a liquid fluorine-liquid ammonia system. Ethylenediamine has a little higher specific thrust but has a freezing point of 47° F. which is too high to be universally usable at all launching sites for rockets. Triethylamine is a liquid that freezes at −175° F. Gasoline usually freezes at below −76° F. Triethylamine has a further advantage in that the mixture ratio of oxidizer to fuel in the propellant combination is lower than the mixture ratio necessary for use with gasoline and the bulk density is greater than the fluorine-ammonia system thereby providing additional fuel for regenerative cooling of the rocket engine.

It is desirable although not necessary to carry enough oxygen in the oxygen-fluorine mixture to convert all of the carbon within the organic fuel to carbon monoxide which is a very stable molecule. Less than 1% of the carbon monoxide in the combustion product is decomposed even at the high temperature of 7400° F. Carbon monoxide is very much more stable at the high combustion chamber temperatures which are present in rocket engines than either hydrogen fluoride or nitrogen which would be generated in the combustion gases of a liquid fluorine-ammonia system. Because all of the carbon molecules of a typical hydrocarbon fuel combine with the oxygen, all of the fluorine is free to unite with the hydrogen which gives better rocket performance than a fluorine-carbon reaction.

The performance of the oxidizers varies with the "oxidation ratio." The oxidation ratio is the ratio of the mixture ratio to the stoichiometric mixture ratio.

In the following table, examples of performance are given of the oxidizers of this invention in combination with various fuels. The value given in the left-hand column is for an oxidation ratio of 0.7, while the value given in the second column is for an oxidation ratio of 0.8. The third column is for an oxidation ratio of 0.9, and the fourth column is for an oxidation ratio of 1.0.

FLUORINE-AMMONIA

| | | | | |
|---|---|---|---|---|
| Weight Percent $F_2$ in Oxidizer | 100 | 100 | 100 | 100 |
| Bulk Density, gm./cc. | 1.12 | 1.15 | 1.18 | 1.2 |
| Weight Mixture Ratio of Oxidizer to Fuel | 2.3 | 2.8 | 3.0 | 3.4 |
| Weight Percent HF in Exhaust | 72 | 72 | 72 | 71 |
| Specific Thrust, lb./(lb./sec.) | 305 | 305 | 303 | 302 |
| Chamber Temp., °F | 6,750 | 7,100 | 7,300 | 7,350 |

FLUORINE-OXYGEN-GASOLINE

| | | | |
|---|---|---|---|
| Weight Percent $F_2$ in Oxidizer | 65 | 67 | 70 |
| Bulk Density, gm./cc. | 1.12 | 1.13 | 1.17 |
| Weight Mixture Ratio of Oxidizer to Fuel | 3.2 | 3.5 | 3.8 |
| Weight Percent HF in Exhaust | 50 | 52 | 52 |
| Specific Thrust lb./(lb./sec.) | 295 | 296 | 297 |
| Chamber Temp., °F | 7,100 | 7,300 | 7,450 |

FLUORINE-OXYGEN-ETHYLENEDIAMINE

| | | |
|---|---|---|
| Weight Percent $F_2$ in Oxidizer | 77 | 79 |
| Bulk Density, gm./cc. | 1.22 | 1.23 |
| Weight Mixture Ratio of Oxidizer to Fuel | 2.3 | 2.6 |
| Weight Percent HF in Exhaust | 53 | 55 |
| Specific Thrust, lb./(lb./sec.) | 299 | 300 |
| Chamber Temp., °F | 7,000 | 7,250 |

FLUORINE-OXYGEN-TRIETHYLAMINE

| | | |
|---|---|---|
| Weight Percent $F_2$ in Oxidizer | 68 | 70 |
| Bulk Density, gm./cc. | 1.13 | 1.15 |
| Weight Mixture Ratio of Oxidizer to Fuel | 2.9 | 3.2 |
| Weight Percent HF in Exhaust | 51 | 52 |
| Specific Thrust, lb./(lb./sec.) | 297 | 298 |
| Chamber Temp., °F | 7,000 | 7,250 |

FLUORINE-OXYGEN-92.5 PERCENT ETHYLALCOHOL

| | | |
|---|---|---|
| Weight Percent $F_2$ in Oxidizer | 87 | 89 |
| Bulk Density, gm./cc. | 1.15 | 1.17 |
| Weight Mixture Ratio of Oxidizer to Fuel | 1.9 | 2.2 |
| Weight Percent HF in Exhaust | 60 | 62 |
| Specific Thrust, lb./(lb./sec.) | 288 | 292 |
| Chamber Temp., °F | 6,500 | 6,850 |

Thus, the performance of a liquid fluorine-liquid oxygen oxidizer together with an organic fuel creates a propellant combination which has high specific thrust and high bulk density. Similar results are obtainable from a fluorine-nitrogen tetroxide oxidizer.

Although the invention has been described and illustrated in detail, it is to be clearly understood that the same is by way of illustration and example only and is not to be taken by way of limitation, the spirit and scope of this invention being limited only by the terms of the appended claims.

I claim:

1. An oxidizer consisting of a mixture of from 65% to 89% liquid fluorine and an oxidizer chosen from the group consisting of liquid oxygen and nitrogen tetroxide.

2. An oxidizer consisting of a mixture of from 65% to 89% liquid fluorine and liquid oxygen.

3. An oxidizer consisting of a mixture of from 65% to 89% liquid fluorine and nitrogen tetroxide.

4. A propellant combination of an oxidizer consisting of 65% to 89% by weight of liquid fluorine in liquid oxygen and a liquid organic fuel chosen from the class consisting of gasoline, ethyl alcohol, triethylamine and ethylenediamine, the ratio by weight of total oxidizer to total fuel being substantially from 1.9 to 3.8.

5. A propellant combination of from 65% to 89% liquid fluorine in liquid oxygen as an oxidizer component and a liquid organic fuel component chosen from the class consisting of gasoline, ethyl alcohol, triethylamine and ethylenediamine, the amount of said oxygen being sufficient to change all of the carbon in said organic fuel to carbon monoxide.

6. A propellant combination of from 65% to 89% liquid fluorine in nitrogen tetroxide as an oxidizer component and a liquid organic fuel component chosen from the class consisting of gasoline, ethyl alcohol, triethylamine and ethylenediamine, the ratio by weight of total oxidizer to total fuel being substantially from 1.9 to 3.8.

7. An oxidizer consisting essentially of a mixture of approximately 70% liquid fluorine oxidizer and approximately 30% of another oxidizer chosen from the group consisting of liquid oxygen and nitrogen tetroxide.

8. A propellant combination of an oxidizer comprising about 70% liquid fluorine and about 30% of an oxidizer chosen from the group consisting of liquid oxygen and nitrogen tetroxide; and an organic liquid fuel chosen from class consisting of gasoline, ethyl alcohol, triethylamine and ethylenediamine, the ratio by weight of total oxidizer to total fuel being substantially from 1.9 to 3.8.

References Cited in the file of this patent

Killeffer: "Scientific American," September 1945, pp. 162–164.

"Rockets," May-August 1946, page 7.

Leonard: "Journal of the American Rocket Society," No. 72, December 1947, pages 10–23.

Thompson: "Annual Report of the British Interplanetary Society" (1952), pages 333–341.